(12) United States Patent
Huang

(10) Patent No.: US 10,819,874 B2
(45) Date of Patent: Oct. 27, 2020

(54) POSITIONING ADJUSTMENT APPARATUS FOR MOBILE DEVICE IN SCANNING AND PHOTOGRAPHY

(71) Applicant: Kuo-Chen Huang, Taoyuan (TW)

(72) Inventor: Kuo-Chen Huang, Taoyuan (TW)

( * ) Notice: Subject to any disclaimer, the term of this patent is extended or adjusted under 35 U.S.C. 154(b) by 367 days.

(21) Appl. No.: 15/845,759

(22) Filed: Dec. 18, 2017

(65) Prior Publication Data

US 2019/0014230 A1    Jan. 10, 2019

(30) Foreign Application Priority Data

Jul. 4, 2017   (TW) .............................. 106209776 U

(51) Int. Cl.
| | | |
|---|---|---|
| *H04N 1/107* | (2006.01) | |
| *B02C 18/00* | (2006.01) | |
| *G03B 17/56* | (2006.01) | |

(52) U.S. Cl.
CPC ....... *H04N 1/1077* (2013.01); *B02C 18/0007* (2013.01); *G03B 17/561* (2013.01); *H04N 2201/0436* (2013.01)

(58) Field of Classification Search
CPC ............. H04N 1/1077; H04N 1/19568; H04N 2201/0436
See application file for complete search history.

(56) References Cited

U.S. PATENT DOCUMENTS

| | | | | |
|---|---|---|---|---|
| 3,161,161 A | * | 12/1964 | La Verne | ............... A47B 41/02 108/81 |
| 4,638,413 A | * | 1/1987 | Tarlow | .................... F21S 6/002 362/242 |
| 5,863,209 A | * | 1/1999 | Kim | ......................... G09B 5/02 348/373 |
| 6,443,577 B1 | * | 9/2002 | Baldwin | .............. G03B 21/132 353/100 |
| 8,823,962 B2 | * | 9/2014 | Maghakian | ................ B41J 3/44 358/1.13 |
| 9,137,414 B2 | * | 9/2015 | Shen | ..................... H04N 1/0057 |
| 2006/0250662 A1 | * | 11/2006 | Heit | .................... B02C 18/0007 358/474 |
| 2016/0142522 A1 | * | 5/2016 | Kim | ....................... A45C 11/00 455/575.8 |

* cited by examiner

*Primary Examiner* — Clayton E. LaBalle
*Assistant Examiner* — Leon W Rhodes, Jr.
(74) *Attorney, Agent, or Firm* — Rain & Berdo, P.C.

(57) ABSTRACT

Provided is a positioning adjustment apparatus for a mobile device in scanning and photography, including a main body and a lifting unit. An object to be scanned is placed on the main body, and the mobile device placed on a carrier platform of the lifting unit can move up and down along with the lifting unit to adjust a distance between the mobile device and the object to be scanned. After scanning, a document is sent directly to a shredder. The invention also provides a wireless signal transmission to operate the mobile device for scanning or photography to meet various demands of the users.

14 Claims, 5 Drawing Sheets

POSITIONING ADJUSTMENT APPARATUS FOR MOBILE DEVICE IN SCANNING AND PHOTOGRAPHY

CROSS-REFERENCE TO RELATED APPLICATION

This application claims the priority of Taiwanese patent application No. 106209776, filed on Jul. 4, 2017, which is incorporated herewith by reference.

BACKGROUND OF THE INVENTION

1. Field of the Invention

The present invention generally relates to a positioning adjustment apparatus, for carrying a mobile device and adjusting a distance between the mobile device and an object to be scanned, to enable the mobile device for real-time scanning and confirming digital image quality of the scanned documents, and able to send the documents for shredding after scanning.

2. Description of Related Arts

Image scanners and paper shredders are commonly office equipment. The image scanner can produce digital images by scanning photos, printed documents, hand-written documents, and so on. However, after scanning, the scanner usually does not provide functions of real-time confirmation of the image quality produced by scanning; therefore, the scanner is often connected to a computer device with a monitor for displaying the scanned image. As the scanner is often shared by many computers and often placed at a fixed location, the user often is required to move back and forth between the scanner and the computer connected thereto for confirming if the digital image of the scanned documents is clear, or if the scanning is successful.

The smart phone nowadays is equipped with a camera, or even application programs for scanning. However, when the user uses the smart phone to scan or photograph, the smart phone is often handheld, resulting in shaky hand problems. In addition, when scanning a large number of documents with smart phone, the distance between the smart phone and each of the documents is hard to maintain at a fixed distance, thereby resulting in producing the documents of different sizes and different image quality. Therefore, to maintain good scanning quality for a large number of documents, it is required to provide real-time confirmation of the document quality, and maintain a consistent image size and quality.

Moreover, as the scanner is often costly, bulky and too heavy to be constantly portable. In addition, to shred the scanned documents, the documents must be transferred to a shredder, which incurs additional inconvenient movement of the user between the scanner and the shredder.

SUMMARY OF THE INVENTION

The primary objective of the present invention is to provide a positioning adjustment apparatus for a mobile device in scanning and photography, including a main body and a lifting unit, the main body including a top surface for placing an object to be scanned.

The lifting unit includes a standing pillar, a lifting platform and a lifting mechanism. The standing pillar is fixed to a side of the main body along a length direction, and a part of the standing pillar is higher than the top surface of the main body. The lifting platform is disposed on the top surface of the main body, and includes at least a sliding frame, a connection arm, and a carrier platform. The connection arm is connected between the sliding frame and the carrier platform. The sliding frame is sleeved around the standing pillar, and the carrier platform is provided with a window. The carrier platform is for placing a mobile device with a camera facing to the window. The lifting mechanism is a rack-and-gear type lifting mechanism. The sliding frame moves along the standing pillar by the lifting mechanism, a rack of the lifting mechanism is disposed at a side of the standing pillar, and a gear of the lifting mechanism is disposed in the sliding frame and engaged with the rack.

With the present invention, the mobile device can be placed on the carrier platform to photograph and scan the object to be scanned. The carrier platform can be kept completely stationary, thereby preventing from shaking or vibration. When scanning a large number of documents, the distance between the mobile device and the objects to be scanned can be fixed so that the size and the image quality of the scanned documents can be kept stable. In addition, the distance between the carrier platform and the object to be scanned can be adjusted by the carrier platform according to the documents of different sizes.

The present invention further includes a trigger switch, wherein once the trigger switch is activated, a photography command is sent to the mobile device through a transmission means, a photography command is issued to the mobile device through a transmission means. The wireless transmission means may be a Bluetooth transmission or a Wi-Fi transmission. As such, the user can operate the mobile device in a wireless manner.

The present invention is simple in structure, and light weight, thereby easy to be assembled and able to reduce cost. As the present invention is for use with a mobile device, not computers, it is easy to move. Also, since the shredder is accommodated inside the main body, the documents can be sent directly to the shredder after scanning, thereby accomplishing document scanning and shredding operation in one-stop.

The foregoing will become better understood from a careful reading of a detailed description provided herein below with appropriate reference to the accompanying drawings.

BRIEF DESCRIPTION OF DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
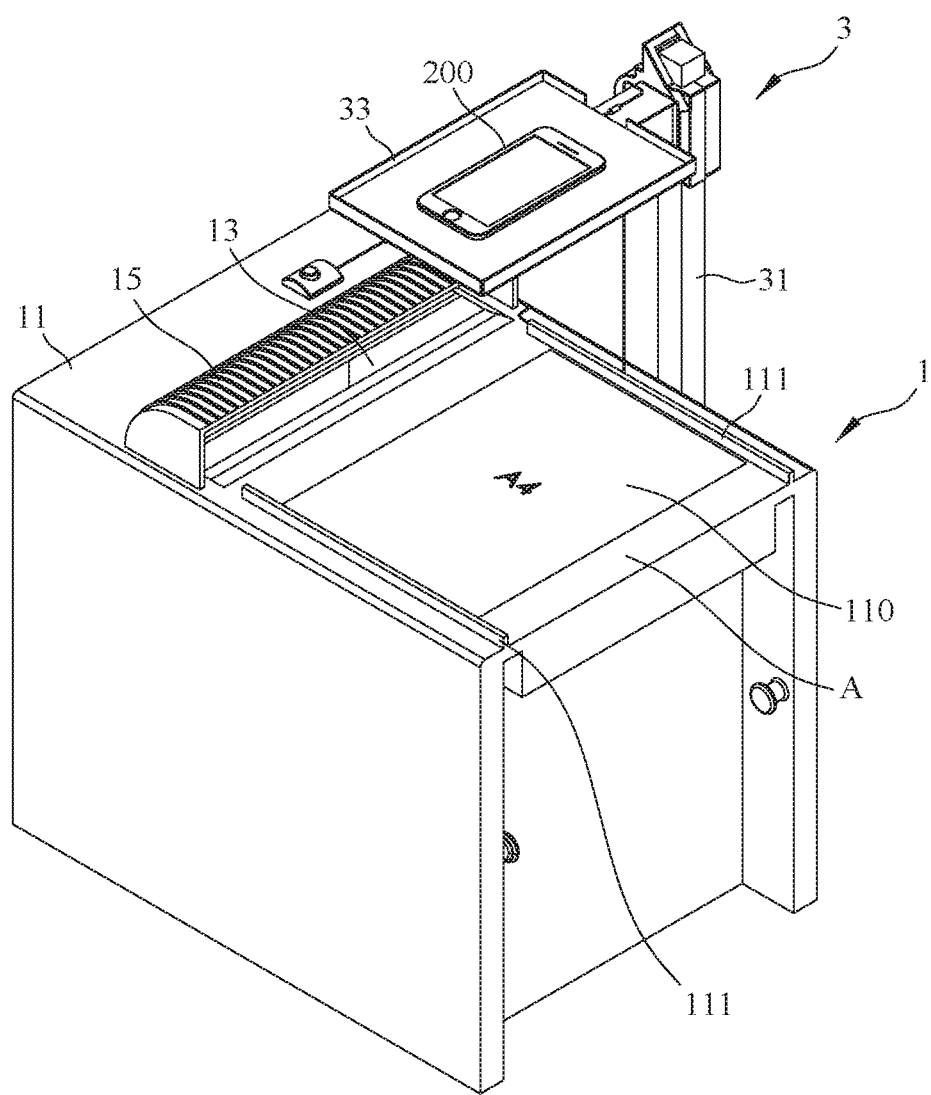
FIG. 1 shows a schematic perspective view of a positioning adjustment apparatus for a mobile device in scanning and photography in accordance with an exemplary embodiment of the present invention.

FIG. 1 shows a schematic perspective view of a positioning adjustment apparatus for a mobile device in scanning and photography in accordance with an exemplary embodiment. As shown in FIG. 1, a positioning adjustment apparatus 100 for a mobile device in scanning and photography comprises a main body 1 and a lifting unit 3, wherein the main body 1 has an accommodation space inside, preferably, in a cubic form.

The main body 1 comprises a top surface 11 for placing an object 110 to be scanned. The object 110 to be scanned can be a paper, a document, an object, or other items to be photographed or scanned. In the present embodiment, an A4-sized paper is used as an example. The preferred top surface 11 is a flat surface or a partially flat surface.

The top surface 11 is further provided with two stop strips 111 disposed in parallel and along a length direction of the main body 1 respectively close to two edges of the main body 1. A placement area A for an object to be scanned is formed between the two stop strips 111. In the present embodiment, the two strips 111 have a length longer than an A4-sized paper. Preferably, one end of the two strips 111 is located at or close to a side edge of the main body 1.

Figure 2:
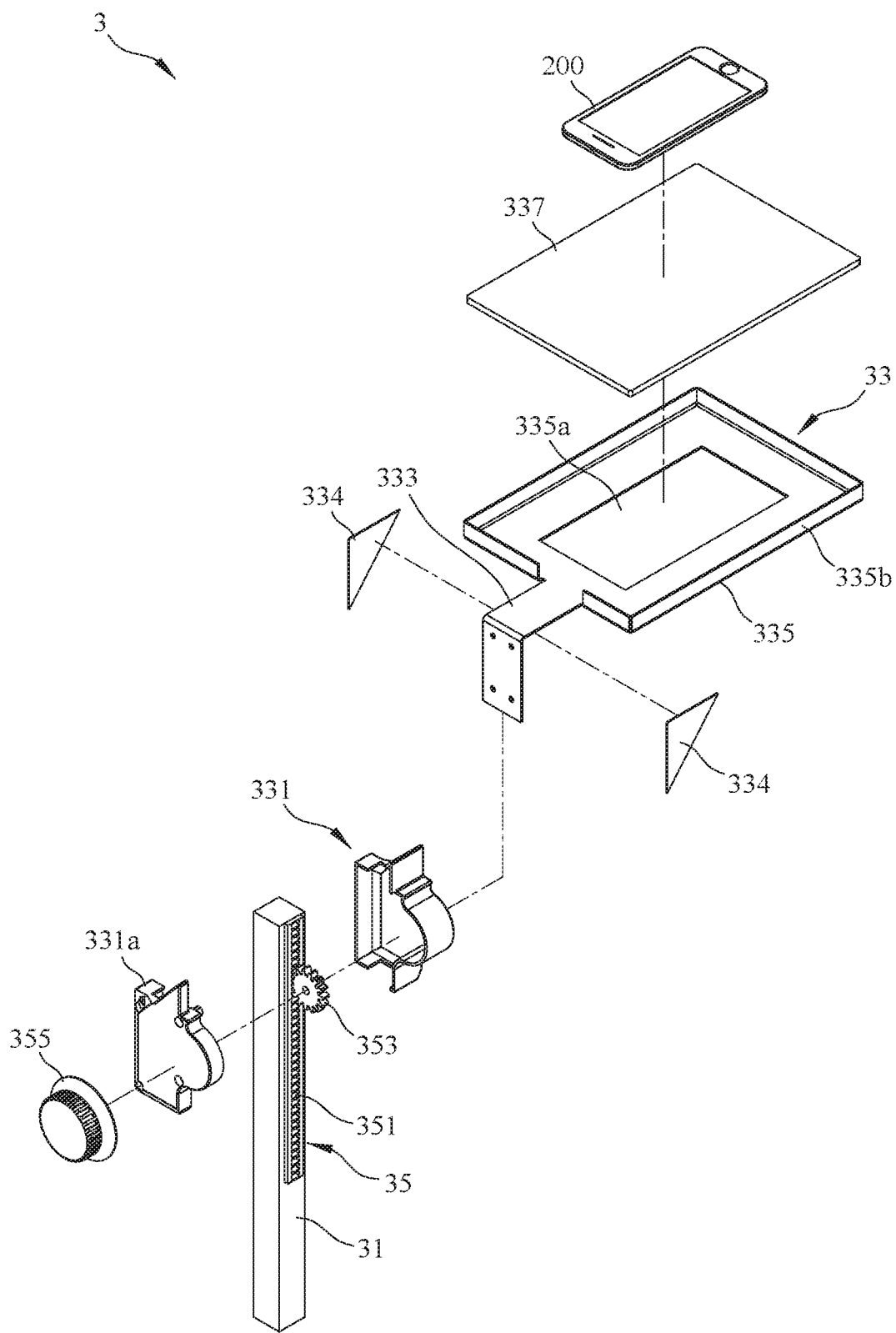
FIG. 2 shows a schematic exploded view of a lifting unit of the present invention.

FIG. 2 shows a schematic exploded view of a lifting unit of the present invention. As shown in FIG. 2. The lifting unit 3 comprises a standing pillar 31, a lifting platform 33 and a lifting mechanism 35. The standing pillar 31 is fixed to one side along a height direction of the main body 1, and a part of the standing pillar 31 is higher than the top surface of the main body 1.

The lifting platform 33 is located over the top surface of the main body 1. The lifting platform 33 at least comprises a sliding frame 331, a connection arm 333, and a carrier platform 335. The connection arm 333 is connected between the sliding frame 331 and the carrier platform 335. The sliding frame 331 is sleeved around the standing pillar 31 so that the lifting mechanism 35 can be moved upward and downward along the standing pillar 31.

The lifting mechanism 35 is a rack-and-gear type lifting mechanism. The rack 351 is disposed at a side of the standing pillar 31. Preferably, the rack 351 is disposed at the side of the standing pillar 31 not corresponding to the main body 1. The gear 353 is disposed in the sliding frame 331 and is engaged with the rack 351. As such, when the gear 353 is rotated, the sliding frame 331 will be moved with the gear 353 along the rack 351. Because the rack 353 is fixed vertically to the standing pillar 31, the sliding frame 331 can be moved up and down along the rack 351. Therefore, the connection am 333 and the carrier platform 335 can be moved along with the sliding frame 331 simultaneously.

Preferably, the gear 353 has a shaft connected to a rotational knob 355. A user can operate the rotational knob 355 to rotate the gear 353 more easily and with less effort.

Preferably, the connection arm 333 and the carrier platform 335 are integrally thrilled, and the connection arm 333 is formed to an L-shape. A vertical part of the connection am 333 is fixed to one side of the sliding frame 331, and a horizontal part of the connection arm 333 is horizontally extended from the edge of the carrier platform 335 toward the standing pillar 31. Preferably, the connection aim 333 further comprises at least a rib plate 334. The rib plate 334 is disposed under the connection arm 333 to enhance the structural strength of the connection arm 333. Preferably, the rib plate 334 has a shape comprising an angle of L-shape, such as triangular, or rectangular.

A mobile device 200 is placed on the carrier platform 335. The carrier platform 335 is provided with a window 335a, and the carrier platform 335 is for placing the mobile device 200 with a camera (not shown) facing to the window 335a and the object 110 to be scanned. The carrier platform 335 has a frame edge 335b. The frame edge 335b is a complete closed frame edge or a closed frame edge with a gap.

Preferably, the present invention thither comprises a transparent plate 337, disposed on the carrier platform 335 and restricted by the frame edge 335b so as to prevent the transparent plate 337 from shifting. The transparent plate 337 can be made of glass, plastic, acrylic, or other transparent materials. As such, when using the mobile device 200 to photograph or activate an application to scan, the window 335a enables the camera to obtain a clear and complete image of the object to be scanned, and the image is displayed in real-time on the mobile device 200 for confirmation.

Figure 3:
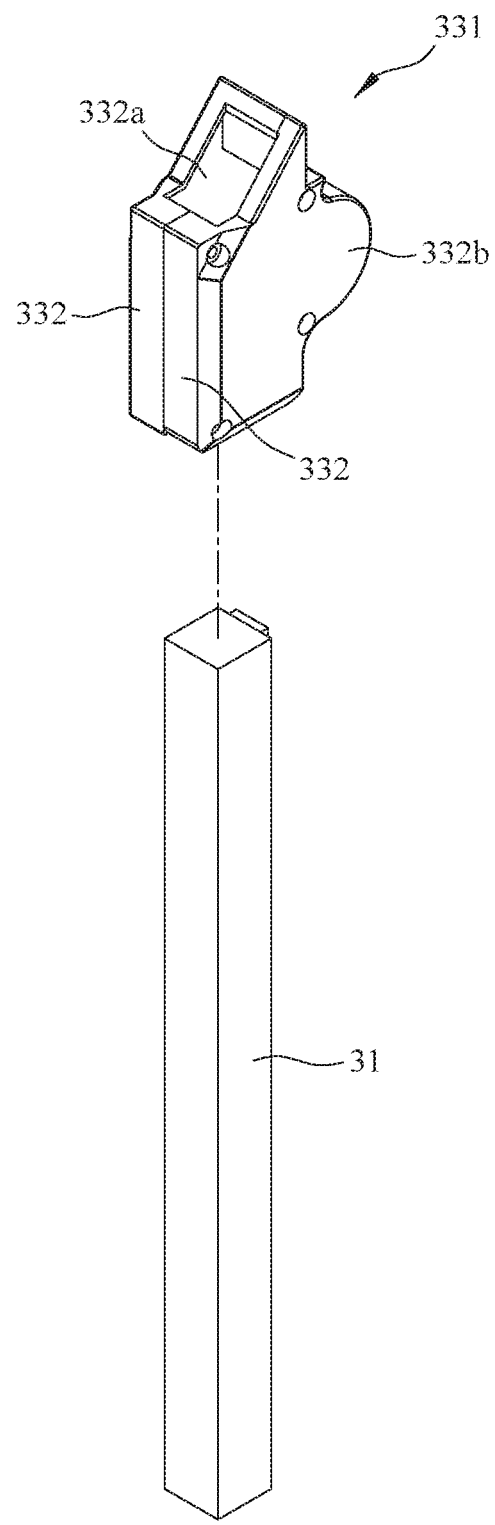
FIG. 3 shows a schematic view of a sliding frame and a standing pillar of the present invention.

FIG. 3 shows a schematic view of a sliding frame and a standing pillar of the present invention. The sliding frame 331 comprises two symmetrical shells 332. The two shells 332 form a sleeve portion 332a corresponding to an outer profile of the standing pillar 31 and a gear accommodation portion (not shown) to accommodate the gear 353. A side of the sliding frame 331 corresponding to the rack 351 of the standing pillar 31 forms a convex portion 332b of a hemisphere shape. The convex portion 332b defines the gear accommodation portion.

Figure 4:
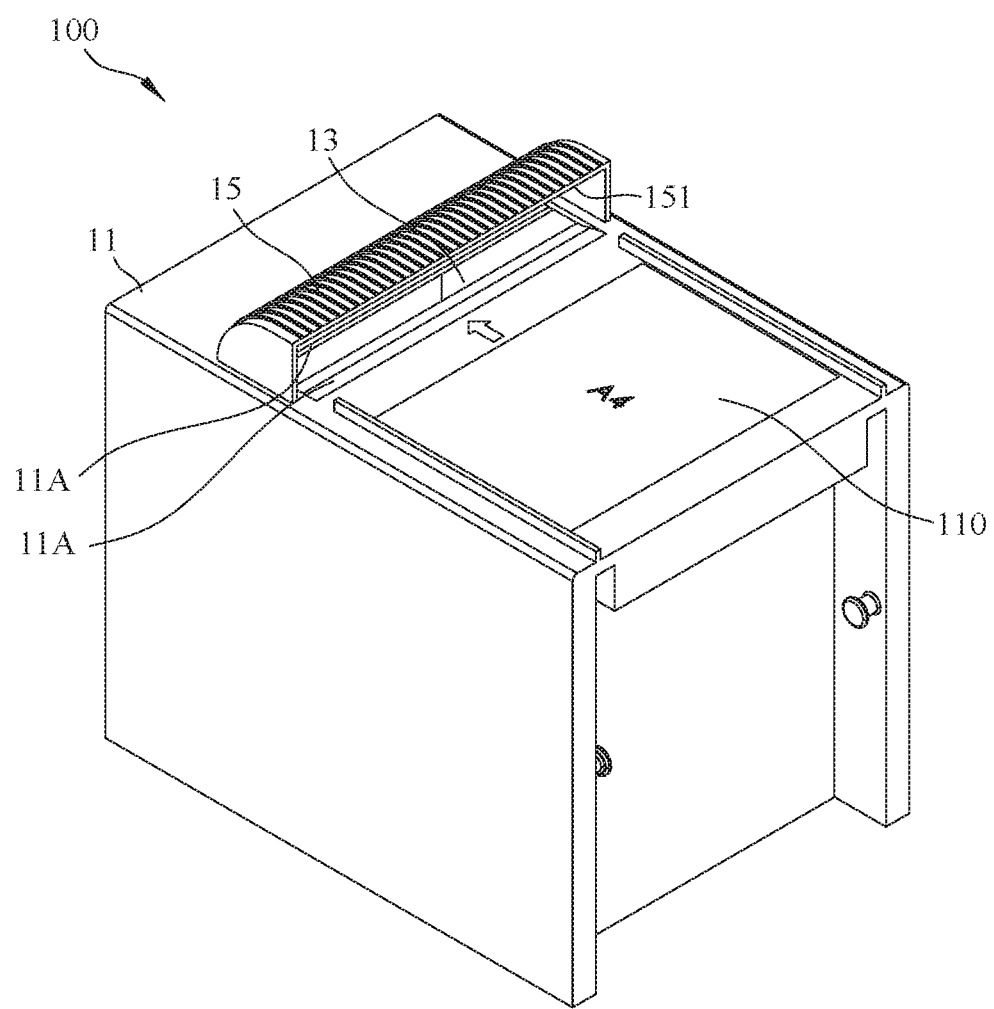
FIG. 4 shows a schematic view of a guiding opening and a guiding cover of the present invention.

FIG. 4 shows a schematic view of a guiding opening and a guiding cover of the present invention. The top surface 11 of the main body 1 is further provided with a guiding opening 13. The guiding opening 13 is disposed along a width direction of the main body 1, and spaced apart a distance from the object 110 to be scanned. The guiding opening 13 has a width suitable for the object 110 to be scanned entering the inside of the main body 1. A slant surface 11A is formed on the top surface 11 at one or two sides of guiding opening 13 corresponding to the object 110 to be scanned so that the object 110 to be scanned can enter the guiding opening 13 more naturally.

The present invention can further comprises a shredder (not shown) disposed inside the main body 1. An opening of the shredder is corresponding to the guiding opening 13.

Accordingly, the present invention can further comprise a guiding cover 15 covering over the guiding opening 13. An opening 151 is disposed at a side of the guiding cover 15 close to the object 110 to be scanned. The guiding cover 15 is a covering shell with an arc portion. The arc portion of the covering shell has a structural profile to guide the object 110 to be scanned entering the guiding opening 13.

Figure 5:
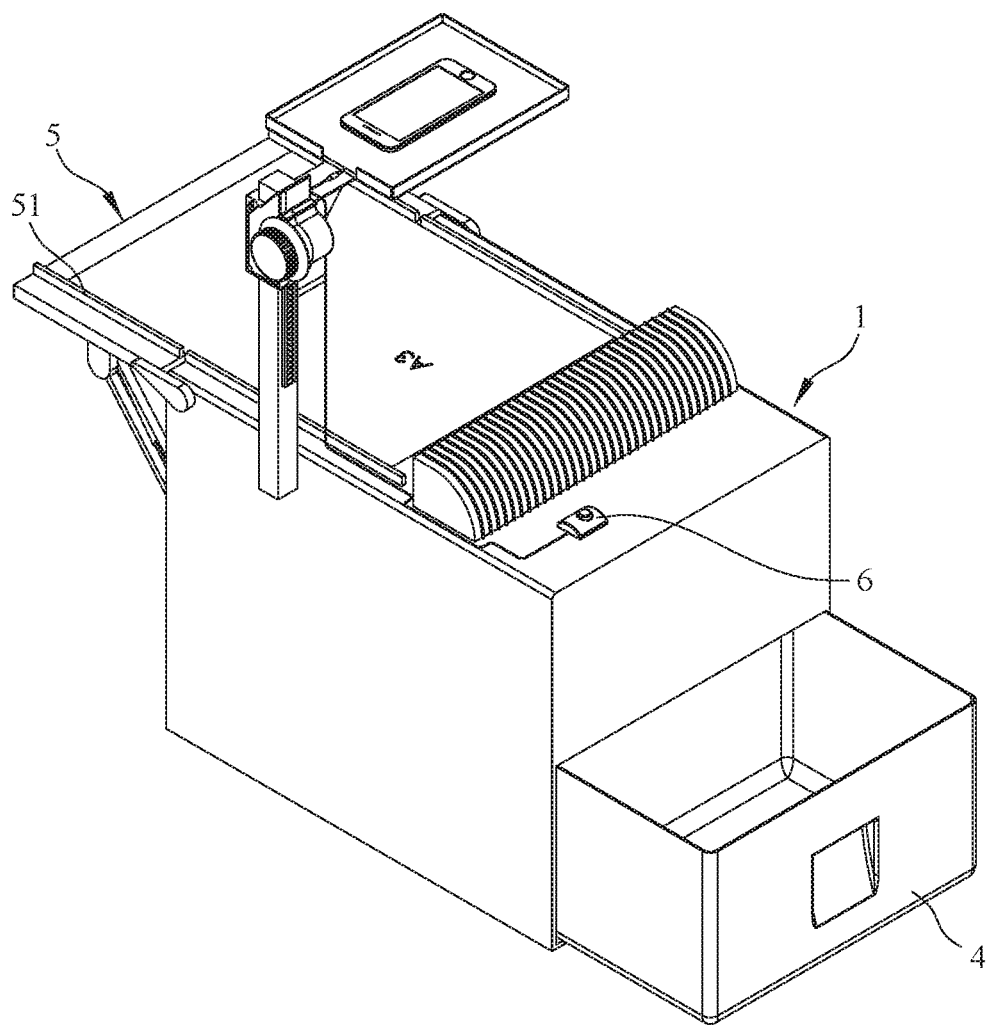
FIG. 5 shows a schematic perspective view, from another direction, of the positioning adjustment apparatus for the mobile device in scanning and photography in accordance with an exemplary embodiment.

FIG. 5 shows a schematic perspective view, from another direction, of the positioning adjustment apparatus for the mobile device in scanning and photography in accordance with an exemplary embodiment. As shown in FIG. 5, the present invention further comprises a shredded paper collector box 4 disposed inside the main body 1 and located below an exit of the shredder.

As shown in FIG. 5, the present invention further comprises an extension plate 5 disposed in a foldable manner at a side of the main body 1. When unfolded, a top surface of the extension plate 5 is leveled with the top surface 11 of the main body 1. The top surface of the extension plate 5 is preferably provided with two extension stop strips 51 corresponding to the two stop strips 111. Preferably, the two stop strips 111 and the two extension stop strips 51 are linearly aligned with each other. When the extension plate 5 is unfolded, the carrier area of the main body can be extended by the extension plate 5 to allow placement of larger size object 110 to be scanned, such as A3 or A2C size papers.

As shown in FIG. 5, the present invention further comprises a trigger switch 6. Once the trigger switch 6 is activated, a photography command is sent to the mobile device 200 through a transmission means. The transmission means includes a wired transmission means or a wireless transmission means, wherein the wireless transmission means may be a Bluetooth transmission or a Wi-Fi transmission.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A positioning adjustment apparatus for a mobile device in scanning and photography, comprising:
   a main body having a top surface for placing an object to be scanned; and
   a lifting unit, comprising:
      a standing pillar fixed to a side of the main body along a length direction, a part of the standing pillar being higher than the top surface of the main body;
      a lifting platform disposed on the top surface of the main body, the lifting platform comprising at least a sliding frame, a connection arm, and a carrier platform, wherein the connection arm is connected between the sliding frame and the carrier platform, the sliding frame is sleeved around the standing pillar, and the carrier platform is provided with a window, wherein the carrier platform is for placing a mobile device with a camera facing to the window; and
      a lifting mechanism being a rack-and-gear type lifting mechanism, the sliding frame moving along the standing pillar by the lifting mechanism, a rack of the lifting mechanism being disposed at a side of the standing pillar, and a gear of the lifting mechanism being disposed in the sliding frame and engaged with the rack,
      wherein when the gear is rotated, the sliding frame moves with the gear along the rack,
   wherein a frame edge is formed at an edge of the carrier platform, and
   wherein the positioning adjustment apparatus further comprises a transparent plate disposed on the carrier platform and restricted by the frame edge.

2. The positioning adjustment apparatus as claimed in claim 1, wherein the object to be scanned is a paper, a document, or an object.

3. The positioning adjustment apparatus as claimed in claim 1, wherein the top surface further comprises two stop strips disposed in parallel and along a length direction of the main body respectively close to two edges of the main body to form a placement area for the object to be scanned between the two stop strips.

4. The positioning adjustment apparatus as claimed in claim 1, wherein the gear has a shaft connected to a rotational knob.

5. The positioning adjustment apparatus as claimed in claim 1, wherein the connection arm and the carrier platform are integrally formed, and the connection arm is L-shaped and has a vertical part fixed to one side of the sliding frame and a horizontal part extending from an edge of the carrier platform toward the standing pillar.

6. The positioning adjustment apparatus as claimed in claim 1, wherein a frame edge is formed at an edge of the carrier platform.

7. The positioning adjustment apparatus as claimed in claim 1, wherein the transparent plate is made of glass, plastic, or acrylic.

8. The positioning adjustment apparatus as claimed in claim 1, wherein the sliding frame comprises two symmetrical shells, the two shells form a sleeve portion corresponding to an outer profile of the standing pillar and a gear accommodation portion to accommodate the gear, a side of the sliding frame corresponding to the rack of the standing pillar forms a convex portion of a hemisphere shape, which defines the gear accommodation portion.

9. The positioning adjustment apparatus as claimed in claim 1, wherein the top surface of the main body is further provided with a guiding opening spaced apart a distance from the object to be scanned, a slant surface is formed on the top surface at one or two sides of the guiding opening corresponding to the object to be scanned.

10. A positioning adjustment apparatus for a mobile device in scanning and photography, comprising:
   a main body having a top surface for placing an object to be scanned; and
   a lifting unit, comprising:
      a standing pillar fixed to a side of the main body along a length direction, a part of the standing pillar being higher than the top surface of the main body;
      a lifting platform disposed on the top surface of the main body, the lifting platform comprising at least a sliding frame, a connection arm, and a carrier platform, wherein the connection arm is connected between the sliding frame and the carrier platform, the sliding frame is sleeved around the standing pillar, and the carrier platform is provided with a window, wherein the carrier platform is for placing a mobile device with a camera facing to the window; and
      a lifting mechanism being a rack-and-gear type lifting mechanism, the sliding frame moving along the standing pillar by the lifting mechanism, a rack of the lifting mechanism being disposed at a side of the standing pillar, and a gear of the lifting mechanism being disposed in the sliding frame and engaged with the rack,
   wherein when the gear is rotated, the sliding frame moves with the gear along the rack,
   wherein the top surface of the main body is further provided with a guiding opening spaced apart a distance from the object to be scanned, a slant surface is formed on the top surface at one or two sides of the guiding opening corresponding to the object to be scanned, and wherein
   the positioning adjustment apparatus further comprises a shredder disposed inside the main body, the shredder having an opening corresponding to the guiding opening.

11. The positioning adjustment apparatus as claimed in claim 10, further comprising a guiding cover covering over the guiding opening, and having an opening disposed at a side of the guiding cover close to the object to be scanned, and the guiding cover having an arc portion.

12. The positioning adjustment apparatus as claimed in claim 11, further comprising a shredded paper collector box disposed inside the main body and located below an exit of the shredder.

13. The positioning adjustment apparatus as claimed in claim 3, further comprising an extension plate disposed a foldable manner at a side of the main body, wherein when unfolded, a top surface of the extension plate is leveled with the top surface of the main body, the top surface of the extension plate is provided with two extension stop strips corresponding to the two stop strips.

14. The positioning adjustment apparatus as claimed in claim 1, further comprising a trigger switch, wherein once the trigger switch is activated, a photography command is sent to the mobile device through a transmission means, and the transmission means comprises a wired transmission means or a wireless transmission means, wherein the wireless transmission means is a Bluetooth transmission or a Wi-Fi transmission.

* * * * *